United States Patent [19]

Webb

[11] Patent Number: 5,333,490
[45] Date of Patent: * Aug. 2, 1994

[54] SECONDARY CONTAINMENT SYSTEM USING FLEXIBLE PIPING

[75] Inventor: Michael C. Webb, Exton, Pa.

[73] Assignee: Total Containment, Inc., Oaks, Pa.

[ * ] Notice: The portion of the term of this patent subsequent to Aug. 20, 2008 has been disclaimed.

[21] Appl. No.: 7,906

[22] Filed: Jan. 22, 1993

Related U.S. Application Data

[60] Continuation of Ser. No. 921,377, Jul. 30, 1992, abandoned, which is a continuation of Ser. No. 713,984, Jun. 12, 1991, abandoned, which is a continuation of Ser. No. 611,435, Nov. 13, 1990, Pat. No. 5,060,509, which is a continuation of Ser. No. 348,396, May 8, 1989, Pat. No. 5,040,408, Division of Ser. No. 254,021, Oct. 6, 1988, abandoned, which is a continuation-in-part of Ser. No. 103,206, Oct. 1, 1987, Pat. No. 4,805,444.

[51] Int. Cl.⁵ .................. B65D 90/10; B65D 90/48
[52] U.S. Cl. ................... 73/40.5 R; 52/20; 137/363; 404/26
[58] Field of Search ............. 73/40.5 R, 49.2; 52/190, 192, 198, 19, 20; 220/565, 601, 661; 222/108, 109, 111, 182, 377, 383, 401; 404/25, 26; 137/362, 363, 364, 366, 370, 312

[56] References Cited

U.S. PATENT DOCUMENTS

| | | | |
|---|---|---|---|
| 1,582,191 | 4/1926 | Snooke | 137/363 |
| 1,639,495 | 8/1927 | Frame | 404/26 |
| 1,793,038 | 2/1931 | Zimmermann | 404/26 |
| 2,254,668 | 9/1941 | Tomek | 404/26 |
| 2,671,573 | 3/1954 | Hendon | 220/416 |
| 2,911,001 | 11/1959 | Fuller | 137/362 |
| 3,362,425 | 1/1968 | Morris et al. | 137/362 |
| 3,390,224 | 6/1968 | Wyatt | 174/37 |
| 3,615,034 | 10/1971 | Lemelson | 220/267 |
| 3,712,009 | 1/1973 | Campagna | 52/20 |
| 3,715,958 | 2/1973 | Crawford et al. | 52/21 |
| 3,938,285 | 2/1976 | Gilbu | 52/20 |
| 4,089,139 | 5/1978 | Moffa | 52/20 |
| 4,275,757 | 6/1981 | Singer | 137/363 |
| 4,472,911 | 9/1984 | Jooris et al. | 52/20 |
| 4,540,310 | 9/1985 | Ditcher et al. | 404/25 |
| 4,621,941 | 11/1986 | Ditcher et al. | 404/26 |
| 4,871,084 | 10/1989 | Robbins | 137/363 |
| 4,971,225 | 11/1990 | Bravo | 222/110 |

OTHER PUBLICATIONS

Owens-Corning Fiberglas, Piping Sumps brochure, Dec. 1985.

Reexamination patent application Control No. 90/003030, filed on Apr. 14, 1993. Now pending in Group 2600 and assigned to M. Brock.

Reexamination patent application Control No. 90/003029, filed in Apr. 14, 1993. Now pending in Group 2600 and assigned to M. Brock.

*Primary Examiner*—Hezron E. Williams
*Assistant Examiner*—Michael Brock
*Attorney, Agent, or Firm*—Shlesinger Arkwright & Garvey

[57] ABSTRACT

A pipeline system is provided for a pumping system for fluid products, such as gasoline, diesel fuel and chemicals, and including a pump for pumping such products from a storage tank through through the primary pipeline of the pipeline system to a product dispenser. The pipeline system includes a secondary containment system for the primary pipeline between the tank and dispenser which includes telescoping pipe sections of different diameters. The telescoping piping is installed around the primary pipeline and the pipe sections are, prior to final installation, movable between intermediate and final positions, for enabling completion, testing and inspection of the primary pipeline prior to final completion of the secondary containment system. One section of the telescoping piping is a flexible corrugated pipe which is able to bend around elbows. Compression seals and ring clamps are used to connect the components together.

31 Claims, 11 Drawing Sheets

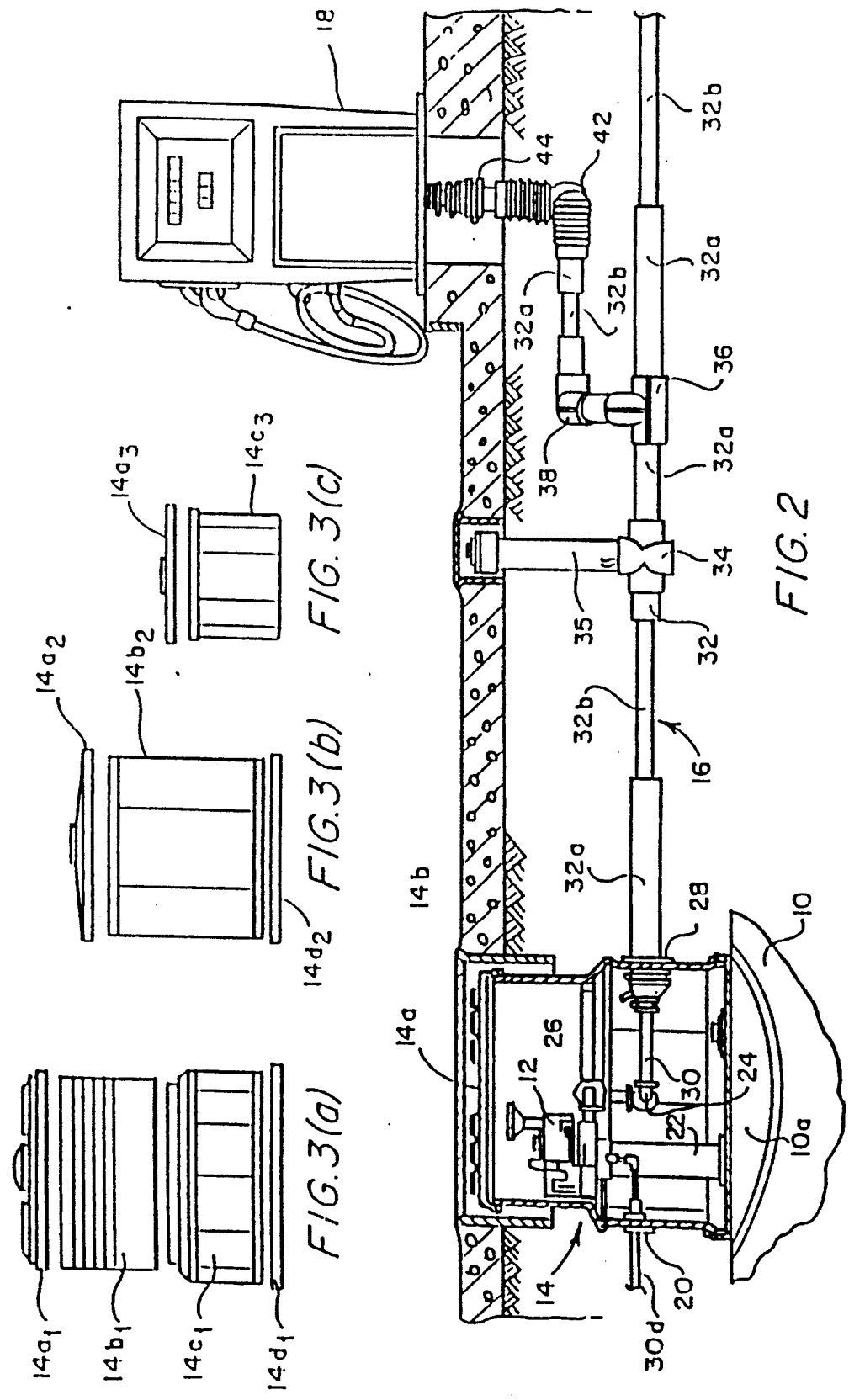

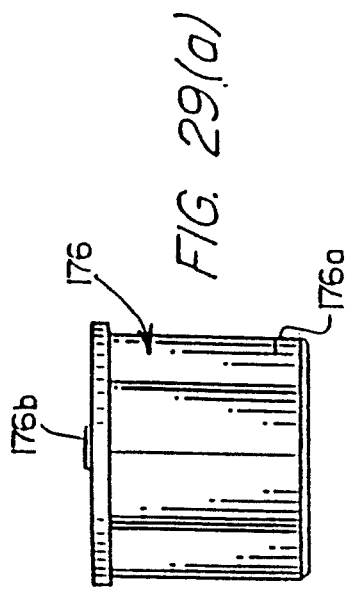
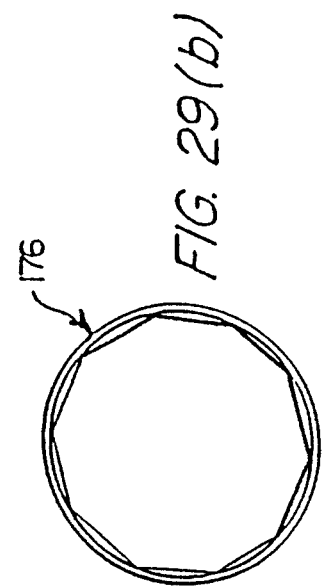
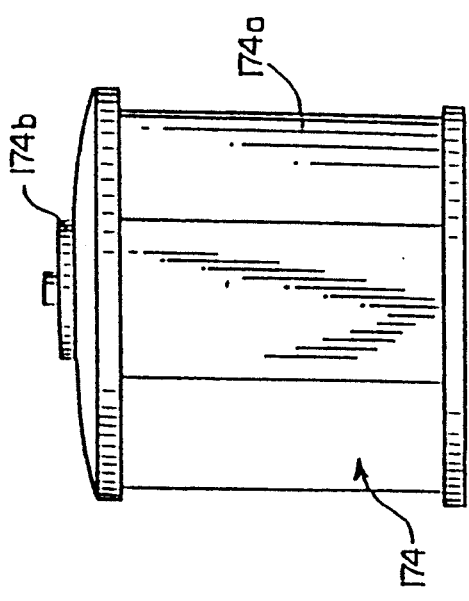
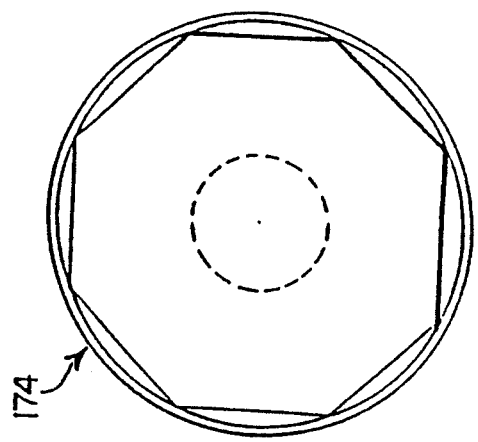

SECONDARY CONTAINMENT SYSTEM USING FLEXIBLE PIPING

CROSS REFERENCE TO RELATED APPLICATIONS

This is a continuation, of application Ser. No. 07/921,377, filed Jul. 30, 1992, which is now abandoned, which was a continuation of application Ser. No. 07/713,984, filed Jun. 12, 1991, which is now abandoned, which was a continuation of application Ser. No. 07/611,435, filed Nov. 13, 1990, now U.S. Pat. No. 5,060,509, which was a continuation of Ser. No. 348,396, filed May 8, 1989, now U.S. Pat. No. 5,040,408, which was a division of Ser. No. 07/254,021, filed Oct. 6, 1988, which is now abandoned, which was a continuation-in-part of Ser. No. 07/103,206, now filed Oct. 1, 1989 U.S. Pat. No. No. 4,805,444.

FIELD OF THE INVENTION

The present invention relates to a secondary containment system for subterranean piping systems used in dispensing of hazardous liquids such as gasoline, diesel fuel and a wide variety of chemicals.

BACKGROUND OF THE INVENTION

Subterranean piping systems such as are typically found at service stations are installed and connected to fuel dispensing pumps so as to provide dispensing of fuels froma fuel storage tank or tanks, usually installed below ground, to fuel dispensers, which are located above ground.

Conventionally, such underground piping systems comprise single wall pipes which are connected together on the site using standard straight pipes and associated fittings such as tees, 90° elbows, 45° elbows, and unions.

The underground storage tanks, the associated piping systems, and the fuel dispensers have all been determined to be sources of environmental pollution, as well as safety hazards because of leakage into the surrounding earth. Fire, explosions, and pollution of ground water have occurred because of these leakages.

With respect to the problem of leakage from underground fuel storage tanks, one solution has been to use double wall tanks, rather than conventional single wall tanks. Double wall steel tanks and double wall fiberglass tanks which are used to remedy this problem (together with a secondary containment and corrosion protection for the tanks) are disclosed in U.S. Pat. Nos. 4,568,925 (Butts) and 4,672,366 (Butts). The secondary containment system disclosed in these patents is applied to a conventional steel tank and creates a unique double wall tank referred to as a "jacketed steel tank". In the event of a leak in the inner primary tank, the leak is contained in the outer secondary tank. Most such double wall tanks are equipped with a leak detection device for signalling an alarm, in the event that a leak should occur.

While such tanks provide a partial solution, it has been determined that a substantial percentage of leakage which occurs at a typical service station site is due to leakage from the underground piping system. Various attempts have been made to deal with this problem. One approach is to install the piping in a trench line with a fuel impervious membrane liner or semi-rigid trough. This technique, if carefully installed, can provide a measure of containment of leakage from the piping system. However, such an approach does not offer truly effective leak detection. In particular, this technique does not permit a determination of when the leak occurred, or of the pipeline in which the leak is located, or of where in a specific pipeline the leak occurred. With such a system, should a leak occur, it may be required that all of the backfill contained within the trench or liner be removed. Further, integrity testing of such a system, by means of air pressure testing is not possible. Further, in general, such systems do not provide 360° containment and thus fill with water, thereby eventually becoming ineffective.

A further solution to the problem of leakage from piping systems involves the use of fiberglass primary piping from the pump of the underground storage tank to the above ground fuel dispenser, this piping being encapsulated with an outer secondary fiberglass pipe and with fittings that are installed simultaneously with the primary pipe. The secondary pipe is, of necessity, of a larger diameter than the primary pipe so as to enable the secondary pipe to slide over the smaller primary pipe. The secondary fittings are of a clam shell design adapted to fit over primary fittings after the primary pipe has been bonded together, integrity tested and inspected. Secondary fittings are bonded to the secondary pipe by a combination of nuts and bolts, and through the use of fiberglass resins or a fuel resistant sealant. Such a solution does not permit a complete inspection of the entire primary piping system during an air pressure integrity test. Due to the construction and design of this system, the limited components available, and the bonding techniques used, it is difficult to install a system of this type which is air pressure testable. Further, the components of this system are expensive to make as well as expensive to install.

General considerations, and both present and future regulatory requirements for primary piping, dictate that the piping possess a number of basic characteristics and meet a number of general design criteria. In this regard, the secondary containment system should be of such a design that the secondary system contains the primary system from the dispenser to the tank including the submersible pump housing and all swing joints. In addition, the secondary containment system should allow for complete inspection of the primary pipe fittings during an air pressure soap test, before the secondary pipe system is completed. Further, the secondary containment system should be compatible with the products to be stored. In addition, the secondary containment system should be non-corrosive, dielectric and non-degradable, and should be resistant to attack from microbial growth. Still further, the secondary containment system, the materials used therein and the design thereof, should be of sufficient strength to withstand the maximum underground burial loads. In addition, the secondary containment fittings should be capable of being installed over the primary fittings after completion, testing and inspection of the primary piping system is complete so as to allow inspection of the primary fittings during such testing. Further, the secondary containment system should have a monitored fuel collection sump at the low end of the system which provides a fitting for insertion of a continuous monitoring sensor for signaling an alarm should a leak occur in the primary piping.

SUMMARY OF THE INVENTION

In accordance with the present invention, an improved secondary containment system is provided for steel and fiberglass primary pipelines. The system of the invention is such that it permits the primary pipeline to be completely installed, integrity tested and inspected before the secondary containment system is permanently fixed and sealed into position. Once installed, the secondary containment system of the invention performs as an air-tight guttering system, providing containment of the primary pipe from under the dispenser to the pump for the tank, including all swing joints or flex connectors. Any leak in the primary piping will flow from the high end of the system, under the product dispenser, to a collection sump, which contains the pump and associated fittings, at the low end of the system. Leakage detection can be accomplished at the collection sump by means of visual or electronic monitoring.

In accordance with the present invention, there is provided, in a pumping system for fluid products such as gasoline, diesel fuel and chemicals, and including a pump for pumping such products from a storage tank through a primary pipeline to a product dispenser, a secondary containment system for the pipeline between the storage pipe and the product dispenser which includes a secondary pipe system surrounding the primary pipeline, the secondary pipe system including telescoping pipe sections of different diameters, which is installed around the primary pipeline and which, when installed, is movable from an initial, intermediate position to a final, installed position, for enabling completion, testing and inspection of the primary pipeline prior to final completion of the secondary containment system.

In accordance with a first embodiment of the invention, the telescoping pipe sections have smooth walls and are a slightly different diameter so that the outer, larger diameter pipe can telescope or slide freely over the inner pipes. According to this embodiment, the secondary containment system preferably further comprises a fusion welding wire bond between at least two overlapping portions of the telescoping pipe sections. As discussed below, the fittings are split to allow installation thereof over the primary piping and thereafter are joined together at the split preferably using fusion rod welding. Thus, this embodiment preferably employs fusion rod welding in sealing the splits in fitting, pipe entries into sump-risers and sump-riser connections, and uses fusion wire welding to seal telescoping pipe overlap joints and fitting-pipe overlap joints.

In accordance with a second embodiment of the invention, the telescoping pipe sections comprise an inner, smooth wall pipe contained within an outer pipe which is of slightly larger diameter so as to permit telescoping thereof over the inner pipe and which is also flexible and includes "convolutions" or corrugations therein, i.e., alternating annular portions of different diameters (in the nature of an accordian) so as to permit bending thereof.

In contrast to the first embodiment which, as was mentioned above and is discussed in more detail below, uses two types of plastic welding in providing sealing and connections, the system of the second embodiment does not use plastic welding and is preferably connected and sealed by rubber gaskets or compression seals inserted inside an overlap joint, with outside compression advantageously being provided by a stainless steel clamp.

With respect to the fittings of the second embodiment, a tee fitting is used which is not split (and thus does not require joinging at the split) and which is sized large enough relatively to the tee fitting of the primary pipe to permit the primary tee to be inserted therein, prior to the pirmary tee being permanently connected to the primary pipe. The secondary tee fitting is sealed to the smooth wall inner pipe of the telescoping pipe section preferably by means of rubber gaskets or compression seals and associated stainless steel clamps, and no plastic welding at all is required. Further, with respect to 45° and 90° elbow fittings, the convoluted, flexible outer pipe of the telescoping pipe section is used to contain all 45° and 9)° primary fittings by simply sliding the flexible pipe around and over these fittings. Accordingly, no separate secondary 45° and 90° elbow fittings are used or required. Regarding the pipe and conduit exits from the sump-risers described below, no welding is required and these exits are preferably sealed by means of rubber grommets, and the sump-riser components and sump-riser base are sealed by means of a rubber U-channel and machine screws as described hereinafter. Thus, it will be seen from the foregoing that in accordance with the second embodiment, the welded connections of the first embodiments are replaced by sealed mechanical connections preferably using rubber seals and stainless steel clamps.

In accordance with a further important aspect of the invention, the secondary containment system preferably comprises an air-test clamp assembly for, in use, enabling air pressure testing of the secondary containment system incorporating the secondary pipe system. Preferably, this test clamp assembly comprises a fitting member, clamping means for releasably clamping one end of the fitting member to the exterior of the primary pipeline and for clamping the other end of the fitting member externally of the secondary pipe system, and valve means in the fitting member for permitting connection of the fitting member to a source of air under pressure so that such air under pressure can be supplied to the secondary containment system for testing purposes. Advantageously, the test clamp assembly is affixed to a wall of a unit of the pumping system, such as the collection sump, the wall having a hole therein through which a portion of the primary pipeline extends and the test clamp assembly further comprising a coupling member including a flange affixed to the wall and a base portion extending through the wall. The clamping means preferably comprises a first clamp for clamping the one end of the fitting member to the exterior of a primary pipeline and a second clamp for for clamping the other end of the fitting to the exterior of the base portion of the coupling member. Advantageously, the fitting member is fabricated of a resilient material and comprises first and second end portions of different diameters and an intermediate portion in which the valve means is disposed.

According to a further important feature of the invention, the secondary containment system preferably comprises leakage monitoring means incorporated in the secondary containment system for providing an indication of a leak in the primary pipeline. The leakage monitoring means preferably comprises a sump fitting having first and second spaced, aligned end portions through which a portion of the primary pipeline system extends, and a sump portion in which product from a leak can collect. Advantageously, the sump fitting is cross shaped or tee shaped and includes an upwardly extending observation portion, in alignment with the sump portion, for permitting observation of any product collected in the sump portion.

Typically the primary pipeline will include at least one flexing connection, such as a swing joint or a flex connector, and in such cases, the secondary containment system preferably comprises a corrugated flexible pipe in which the flexing connection is contained and clamping means for clamping the flexible pipe in place.

In accordance with a further important feature of the first embodiment of the invention which was mentioned previously, at least one secondary fitting is provided for connecting together adjacent portions of the secondary pipe sections of the secondary containment system, the secondary fitting comprising a split fitting member having a split therein in the top surface thereof. Advantageously, the ends of the secondary fitting which define the split are shaped to define a V-groove therebetween and are joined together by a fusion rod weld as mentioned above.

In accordance with a further important aspect of the present invention, a method is provided for installing a piping system for fluid products such as described above (i.e., one including a pump for pumping the product from a storage tank through a primary pipeline to a product dispenser), the method comprising installing a secondary containment system, including telescoping secondary pipes, around the primary pipeline with the telescoping secondary pipes positioned in intermediate positions along the primary pipeline; testing the primary pipeline with the telescoping pipes in the intermediate positions thereof; and moving the telescoping secondary pipes to their final positions so as to enable completion of the installation of the secondary containment system.

As noted above, in accordance with the first embodiment of the invention, the telescoping secondary pipes are preferably fixed in the final positions thereof using fusion wire welding, and split secondary fittings are installed over the primary fittings in the primary pipeline by bending portions of the split fittings adjacent the split backwardly from the split and then installing the fittings over the primary fittings. Advantageously, the split fittings are joined to adjacent pipe sections using fusion wire welding and the portions of the split fitting adjacent to the split are joined together using fusion rod welding.

In accordance with the second embodiment of the invention discussed above, the flexible section of the telescoping pipe sections is simply bent around an elbow fitting, and compression seals and clamps are used to connect and seal the various components.

Other features and advantages of the present invention will be set forth in, or apparent from, the detailed description of preferred embodiments of the invention which follows.

BRIEF DESCRIPTION OF THE DRAWINGS

FIG. 2 is a view similar to that of FIG. 1 illustrating the piping system with the secondary containment system completely installed;

FIGS. 3a, 3b and 3c are front elevational views of further embodiments of the collection sump illustrated in FIGS. 1 and 2;

FIG. 4b is a perspective view of some of the components of the embodiment of FIG. 4a;

FIG. 5b is an exploded perspective view of two of the components of the embodiment of FIG. 5a;

FIG. 6b is a perspective view of two of the components of the embodiment of FIG. 6a;

FIGS. 26a and 26b, 27a and 27b, 28a and 28b, and 29a and 29b are side elevational and top plan views, respectively, of four different sump-riser embodiments of the invention.

DESCRIPTION OF THE PREFERRED EMBODIMENTS

Figure 1:
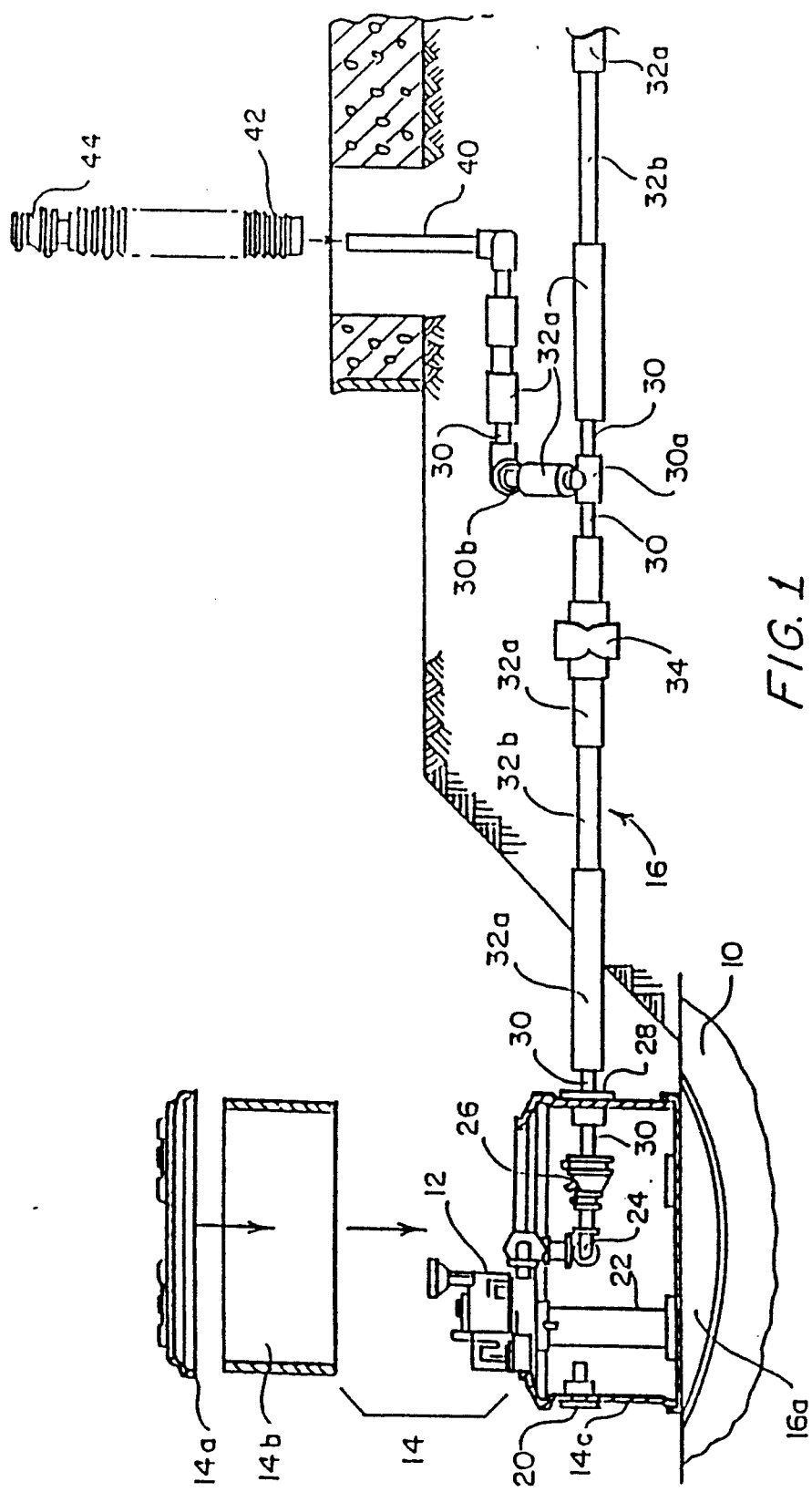
FIG. 1 is a schematic cross sectional view of an overall pumping system illustrating one stage in the assembly of the secondary containment system in accordance with a first embodiment of the invention.

Referring to FIGS. 1 and 2 which illustrate the two stages in assembly of a secondary containment system in accordance with a first embodiment of the present invention in a typical pumping system, the basic integers of the pumping system include a storage tank 10, a portion of which is shown, connected to a submersible pump 12 housed in a collection sump 14. The pump is connected through a piping system, generally denoted 16, to a standard product (e.g. gasoline) dispenser 18. Collection sump 14 is mounted on tank 10 by a mounting arrangement indicated at 10a. A number of possible embodiments of the mounting arrangement for collection sump 10 are discussed below in connection with FIGS. 4a, 4b; 5a, 5b; 6a, 6b; and 7.

Figure 14:
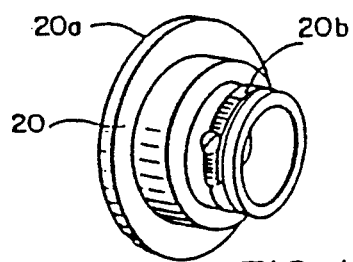
FIG. 14 is a perspective view of a close-off coupling constructed in accordance with a first preferred embodiment of the invention.

Collection sump 14 includes a close-off coupling 20 which is also illustrated in FIG. 14 and which houses a riser pipe 22 that provides a connection between tank 10 and pump 12.

Figure 13:
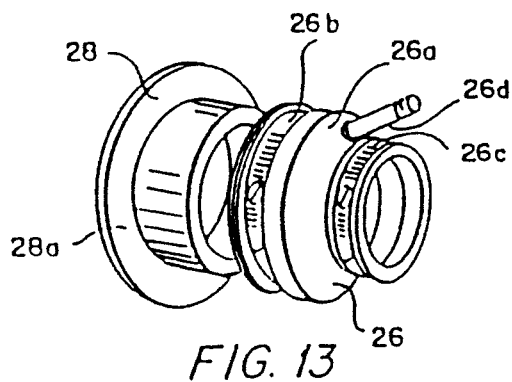
FIG. 13 is an exploded perspective view of an air test clamp assembly constructed in accordance with a first preferred embodiment of the present invention.

The piping system 16 which interconnects pump 12 and dispenser 18 includes a swing joint 24 connected between pump 12 and a straight section of the primary piping 30. An air test clamp assembly 26 is mounted on a section of pipe 30 within collection sump 12 and cooperates with a flanged coupling 28 affixed to a wall of collection sump 10, in a manner described below so as to enable air pressure testing of the primary piping system air test clamp assembly 26 and cooperating bulkhead coupling 28 are also illustrated in FIG. 13 and are described in more detail below in connection with the description of that figure.

As will be apparent from the foregoing, a key element of the secondary containment system of the present invention is the telescoping secondary pipe which surrounds primary pipeline 30 and which comprises a larger diameter pipe 32a and a smaller diameter pipe 32b. The telescoping piping is described in more detail below in connection with FIG. 8.

As illustrated in FIG. 1, the primary pipeline 30 includes a tee fitting 30a and a 90° elbow 30b which are used in connecting the primary pipeline to dispenser 18. The primary pipeline 30 terminates in a swing joint 40 located beneath dispenser 18.

As is also illustrated in FIGS. 1 and 2, a collection sump fitting 34 is disposed between pump 12 and tee fittings 30a (although such collection sump fittings can be installed anywhere in the system) and as illustrated in FIG. 2, collection sump fittings 34, in combination with a riser pipe 35 and a close-off cap 37, form part of an observation well used in detecting leaks in the primary pipeline system. Collection sump fitting 34 is described in more detail below in connection with FIG. 15 and FIG. 16.

As illustrated in FIG. 2, a secondary tee fitting 36 is installed around primary tee fitting 30a and a secondary 90° elbow fitting 38 is installed around primary 90° elbow fitting 30b. Tee fitting 36 is described in more detail in connection with FIG. 9 and 90° elbow fitting 38 is described in more detail in connection with FIG. 10.

As illustrated in FIGS. 1 and 2, a flexible connector 42 including a reducer coupling 44 is installed around and contains swing joint 40. Connector 42 is described in more detail in connection with FIG. 12.

As illustrated in FIGS. 1 and 2, collection sump 14 includes a cover 14a, a riser section 14b and a base or body section 14c. Collection sump 14 is preferably rotationally molded from a thick high density polyethylene and, as illustrated, is located at the low end of the piping system 16. The purposes of sump 14 include (i) acting to collect leaking product in the system, (ii) permitting access for repair or servicing of the pump 12 or the fittings therefor, and (iii) performing as a riser to keep excavation back fill away from the submersible pump 12 and the fittings therefor. The collection sump 14 is provided with flat exit and entry walls (viz. those shown in section in FIGS. 1 and 2) to accomodate the close-off coupling such as that indicated at 20.

Referring to FIGS. 3a, 3b and 3c, three further embodiments of the collection sump of FIGS. 1 and 2 are shown. The embodiment of FIG. 3a is similar to that of FIGS. 1 and 2 and includes a mounting plate 14 $d_1$. FIGS. 3b and 3c illustrate further embodiments of different sizes and incorporating fewer, but similar components. As is illustrated by FIGS. 3a to 3c, collection sumps can be provided in a number of different shapes and sizes in order to accomodate tanks of various sizes as well as different piping applications.

Figure 4A:
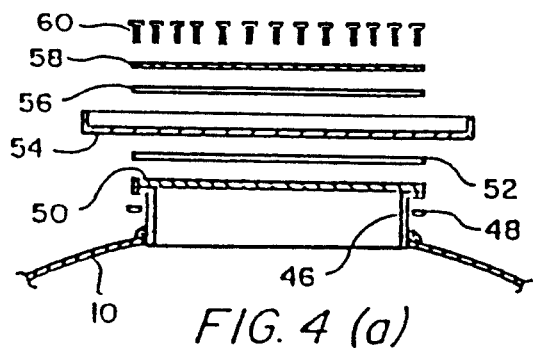
FIG. 4a is an exploded cross sectional view of a first embodiment of a mounting arrangement for the collection sump.
Figure 4B:
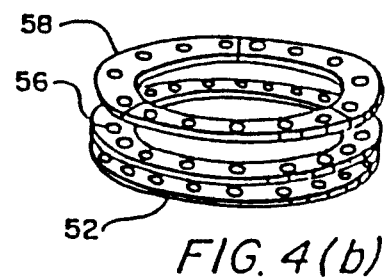

Referring to FIGS. 4a and 4b, a first embodiment of a mounting arrangement for mounting the collection sump onto the storage tank 10 is shown. In this embodiment, storage tank 10 is equipped with a manway 46, with associated manway nuts indicated at 48, and a cover 50, and the base or mounting plate 54 of the collection sump (which corresponds to, for example, base plate 14$d_1$ of FIG. 3a) is pre-cut and drilled to match the bolt hole arrangement of the manway cover 50. To install this mounting, the manway nuts 48 and bolts 60 are removed and a gasket 52, also shown in FIG. 4b, is placed in position over the bolt holes of manway cover 50. Thereafter, the pre-cut and drilled collection sump base plate 54 is positioned over gasket 52 and a further gasket 56, also shown in FIG. 4b, is placed in position inside of the collection sump base plate 54. Next, a three piece compression ring 58, also shown in FIG. 4b, is placed over the gasket 56 and the manway nuts 48 and bolts 60 are replaced. The remainder of the collection sump components are assembled at later stage.

Figure 5A:
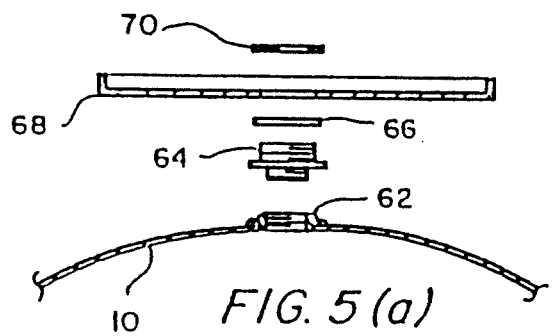
FIG. 5a is an exploded cross sectional view of a further embodiment of a mounting arrangement for the collection sump of FIGS. 1 and 2.
Figure 5B:
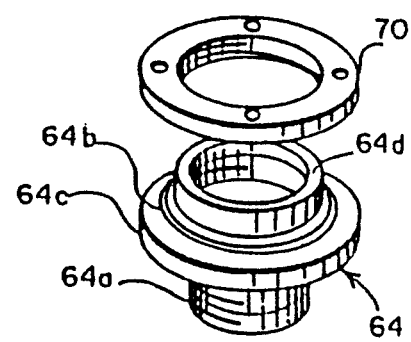

Referring to FIGS. 5a and 5b, a further embodiment of the mounting arrangement for collection sump 14 is shown wherein a sump base plate 68 (corresponding again, for example, to plate 14$_d$ of FIG. 3a,) is mounted directly onto a fitting 62 in the tank 10 by means of a mounting coupling 64 which is also illustrated in FIG. 5b. In accordance with this embodiment, installation begins with screwing of a base portion 64a of coupling 64 into fitting 62 and thereafter placing an O-ring 66 into a groove 64d formed in a flange 64c of coupling 64. Next, a compression ring 70, which is best seen in FIG. 5b, is screwed down onto an upper screw threaded portion 64d of coupling 64. Again, the remainder of the components of collection sump 14 are then assembled at a later stage.

Figure 6A:
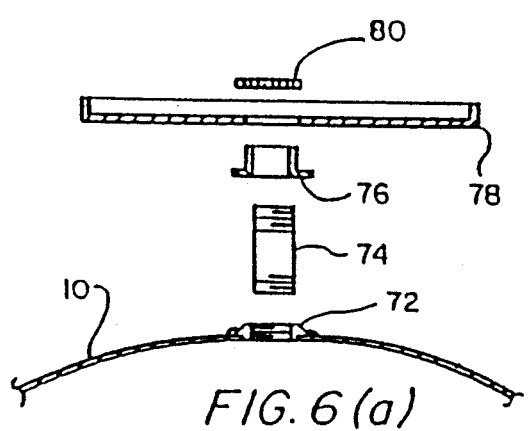
FIG. 6a is an exploded cross sectional view of yet another embodiment of a mounting arrangement for the collection sump of FIGS. 1 and 2.
Figure 6B:
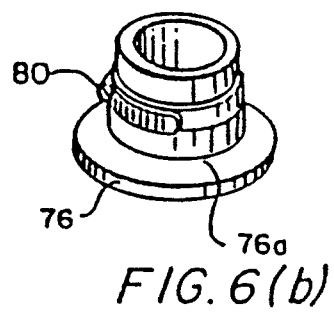

Referring to FIGS. 6a and 6b, a further embodiment of a mounting arrangement for the collection sump 14 is shown wherein the mounting base plate 78 for the collection sump (again corresponding, for example, to plate 14d of FIG. 3a) is mounted directly to a riser pipe 74 (corresponding to riser pipe 22 of FIGS. 1 and 2). Riser pipe 74 screws into a tank fitting 72 (similar to fitting 62 of FIG. 6a) and the installation procedure includes drilling a hole in the collection sump base plate 78 and inserting a mounting coupling 76 (best shown in FIG. 6b), from the bottom, i.e., with flange 76a lowermost. Flange 76a is then fusion rod welded to the underside of the collection sump base plate 78 and this combination, together with clamp 80, is slid down over the riser pipe 22 and the clamp 80 tightened. As before, the remainder of the components of the collection sump are assembled at a later stage.

Figure 7:
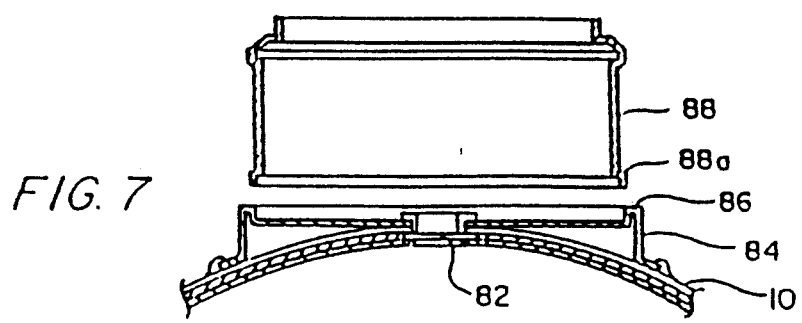
FIG. 7 is an exploded cross sectional view of yet a further embodiment of a mounting arrangement for the collection sump of FIG. 1 and 2.

Referring to FIG. 7, an embodiment of the invention as shown wherein a base portion 88 of the collection sump, (corresponding, for example, to base portion 14c of FIGS. 1 and 2), is mounted directly on a pre-installed saddle 84 in accordance with that provided in U.S. Pat. Nos. 4,568,925 and 4,672,366, referred to above. Saddle 84 surrounds a tank fitting 82 of tank 10 and is specifically constructed to accomodate the body or base portion 88 of the collection sump. A bottom rim 88 of collection sump body 88 fits into a pre-formed retaining ring 86 of saddle 84 and the collection sump body 88 is fusion rod welded to the saddle retaining ring 86 to provide water tightness. As with the embodiments above, the remaining components of the collection sump can be assembled at a later stage.

Figure 8:
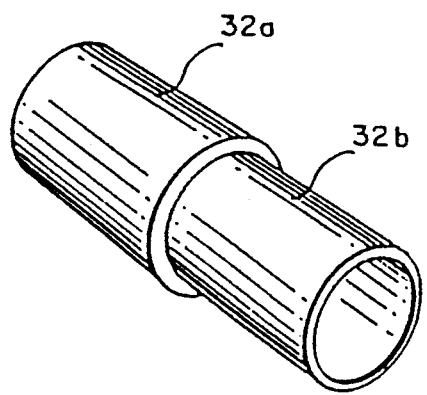
FIG. 8 is a perspective view of the telescoping secondary pipe used in the piping system of FIGS. 1 and 2.

Referring to FIG. 8, a section of telescoping pipe is shown consisting of an outer, larger diameter pipe section 32a and an inner, smaller diameter pipe section 32b, also shown in FIGS. 1 and 2. The secondary piping 32a, 32b is preferrable extruded from high density polyethylene in sizes large enough to fit over the primary piping system 30 with the inner diameter of the outer portion 32a being large enough to contain the outer diameter of inner portions 32b in addition to the added thickness of the fusion welding wire used in joining the sections together and still provide a slight clearance fit. Both sizes of pipe can be extruded from the same extrusion die by carefully adjusting the extrusion speed for the outer and inner portions 32a and 32b, respectively.

Bonding and sealing of the telescoping pipe sections 32a and 32b is provided by a welded overlap joint. High density polyethylene can generally be effectively bonded by fusion which requires the introduction of heat at temperatures sufficient to melt the material. As described in more detail below in connection with FIG. 18, the present invention provides for use of a fusion welding wire which can be slipped between the overlap joint, in the form of a coil, and supplied with electric current from a suitable power supply so as to produce heat sufficient to melt the coating on the wire. This coating is made of the parent high density polyethylene material and thus produces a fusion bond at the point of contact. This fusion welding technique produces a homogeneous weld between the inner pipe section 32b and the outer pipe section 32a at the overlap joint and, as just mentioned, this welding technique is discussed in more detail hereinbelow.

Figure 9:
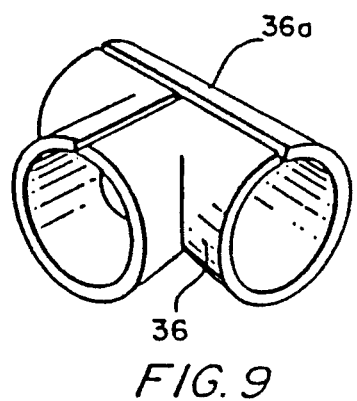
FIG. 9 is a perspective view of a secondary "tee" fitting constructed in accordance with a first preferred embodiment of the invention.
Figure 10:
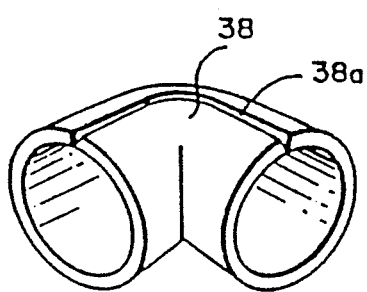
FIG. 10 is a perspective view of a 90° elbow fitting constructed in accordance with a first preferred embodiment of the invention.
Figure 11:
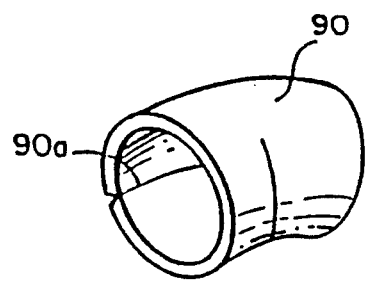
FIG. 11 is a perspective view of a 45° elbow fitting constructed in accordance with a first preferred embodiment of the invention.

FIGS. 9 and 10 illustrate, respectively, the tee fitting 36, and elbow fitting 38, described above in connection with FIGS. 1 and 2, while FIG. 11 discloses a 45° elbow fitting which can be used in other pipeline patterns or arrangements. Fittings 36, 38 and 90 include corresponding V-shaped grooves 36a, 38a, and 90a, respectively, in the tops of the fittings to allow the fittings to be spread apart and fit over the corresponding pre-installed primary fitting. The fittings illustrated in FIGS. 9 to 11 are preferably made of high density polyethylene so that they are strong but flexible enough for the intended application. These fittings are preferably inside molded using a plastic forming process referred to as "rotational molding" but could also be made using a further plastic forming process referred to as "plastic injection molding". The construction of the fittings of FIGS. 9 to 11 permits installation, testing and inspection of the corresponding primary fittings before the secondary containment fittings 36, 38 and 90 are installed. The split fitting 36, 38 and 90 are bonded and sealed to the outer telescoping pipe 32a using the fusion wire welding techniques used for an overlap joint as described above, and as described in more detail in connection with FIG. 18. After these fittings have been fusion wire welded in place, the V-shaped groove or split in the top of the fitting is fusion rod welded to completely seal the fitting. Fusion wire welding is described below in connection with FIG. 19.

Figure 12:
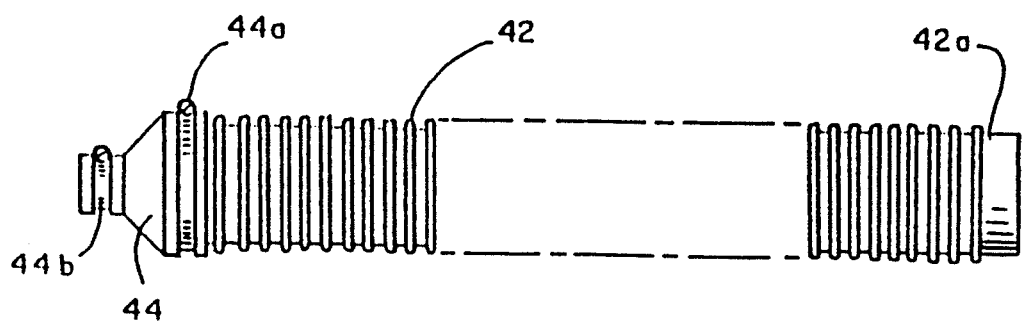
FIG. 12 is a side elevational view of a flexible connector constructed in accordance with a first preferred embodiment of the present invention.

Referring to FIG. 12, a corrugated flexible pipe section 42 corresponding to that shown in FIGS. 1 and 2 is illustrated. The pipe section or connection 42 is preferably rotationally molded of high density polyethylene material and has fitted on the upper end thereof, a reducer fitting 44 corresponding to that described above. Fitting 44 is preferably fabricated of neoprene rubber. Steel clamps 42a and 42b are used to close off the secondary containment piping system beneath product dispenser 18. The flexibility of connector 42 permits containment of a multi-directional swing joint such as that indicated at 40 in FIGS. 1 and 2. It will be appreciated that connector 42 can also be used in connection with flex connectors. The lower end of connector 42a is attached to the outer telescoping secondary containment pipe 32a by means of fusion wire welding.

Referring to FIG. 13, a test clamp assembly 26, and cooperating bulkhead coupling 28, corresponding to those shown in FIGS. 1 and 2, are illustrated. Flanged coupling 28 is preferably rotationally moulded from high density polyethylene. The clamp assembly 26 basically comprises a reducer fitting 26a, preferably fabricated of neoprene rubber; a pair of different diameter stainless steel clamps 26b and 26c; and an air valve stem 26d formed in reducer fitting 26a. Clamp assembly 26, in cooperation with bulkhead coupling 28, is used to seal off the wall of collection sump 14 at a location where a contained primary pipe 30 exits, as illustrated in FIGS. 1 and 2. Once installed, the clamp assembly 26 permits the secondary piping system to be filled with air, through the stem valve 26d, so as to permit an air pressure test to be performed for checking the containment integrity of the piping system.

To install the bulkhead coupling 28, a hole is drilled at the exit location in the collection sump wall referred to above and the bulkhead coupling 28 is inserted with the flange 28a facing outwardly. Flange 28a of bulkhead coupling 28 is then fusion rod welded to the outside wall of the collection sump 14. On the inside of the collection sump 14, the reducer fitting 26a of the clamping assembly 26 is slipped over the inwardly projecting portion of the bulkhead coupling 28 and clamped in place by clamps 26b and 26c. During assembly of the primary piping 30, this piping is installed so as to pass through the test clamp assembly 26 and associated coupling 28.

Referring to FIG. 14, a close-off coupling 20 is illustrated which corresponds that shown in FIGS. 1 and 2. Close-off coupling 20 is used for sealing of the wall of the collection sump 14 at a location where a non-contained primary pipe (indicated at 30d in FIG. 2) exits from the collection sump 14. It will be appreciated that such a non-contained pipe can, for example, be a vent line or a vapor recovery line. To install coupling 20, a hole is drilled at the exit location in the collection sump wall and the coupling 20 is inserted with the flange 20a facing outwardly. The flange 20a is then fusion rod welded to the outside wall of the collection sump 14. On the inside of the collection sump 14, coupling 20 is directly clamped to the primary pipe 30d (FIG. 2) by means of a stainless steel clamp 20b. Close-off coupling 20 is preferably made of rotationally molded, high-density polyethelene.

Figure 15:
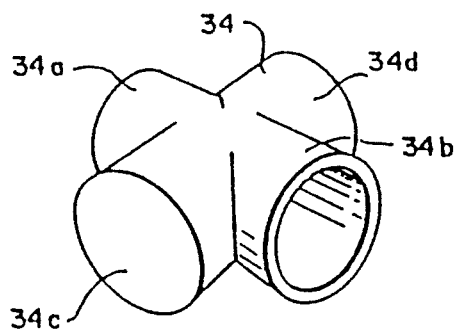
FIG. 15 is a perspective view of a collection sump fitting constructed in accordance with a first preferred embodiment of the invention.
Figure 16:
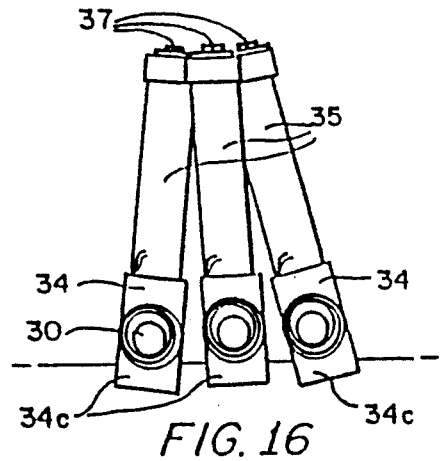
FIG. 16 is a front elevational view, partially in section, of a plurality of pipes incorporating collection sump fittings corresponding to that illustrated in FIG. 12 and forming a plurality of observation wells.

As noted above, in accordance with a preferred embodiment of the present invention, the primary piping is installed so as to slope downwardly from the product dispenser 18 to the collection sump 14 so that any leakage in the primary system will flow to the collection sump. Referring to FIGS. 15 and 16, a cross-shaped sump collection fitting 34, corresponding to that referred to above in connection with FIGS. 1 and 2, is shown which is adapted to be installed at any point between the product dispenser 18 and the collection sump 14 to enable the approximate location of a leak to be determined. Collection sump fitting 34 includes aligned arms 34a and 34b which are bonded to adjacent pipe sections 32a as well as a closed collection sump portion 34c which extends downwardly, in use, so that the product will collect therein. An upwardly extending portion 34d is bonded to riser pipe 35 which is closed off by a neoprene cap 37. With cap 37 removed, one can look down riser pipe 35 into sump portion 34c to determine if there has been product leakage. It will be appreciated that any leakage in the primary pipe between the observation well and the fuel dispenser 18 will flow to and collect in, sump portion 34c.

As illustrated in FIG. 16, where a plurality of pipes are positioned adjacent one another, the collection sump fittings 34, and their assocated riser pipes 35, are preferably tilted towards the center so that the corresponding collections sump portions 34c can be observed from a central area and can be accomodated underneath the same observation manhole.

During installation of the primary piping system 16, the telescoping secondary pipe sections 32a and 32b are fitted over each straight section of the primary pipeline 30 and telescoped back away from the primary fittings 30a and 30b (fittings in FIGS. 1 and 2) so as to not interfere with the assembly of these fittings in the primary piping 30. The length of the telescoping sections 32a and 32b are slightly greater than one-half of the length of the length of straight section of primary pipe 30 between the primary fittings to allow for overlap. Each piping run, i.e., each length of pipe between the fittings, should begin and end with an outer telescopic section 32a, with an inner telescopic section 32b therebetween. The telescoping feature of the secondary containment pipe permits the pipe to be shifted back from the assembly area of the primary pipe 30 and then shifted back and forth to permit complete inspection of the primary pipe 30 (and the primary joints or fittings 30a and 30b) during testing of the primary piping system prior to placing the piping system in service.

Figure 17:
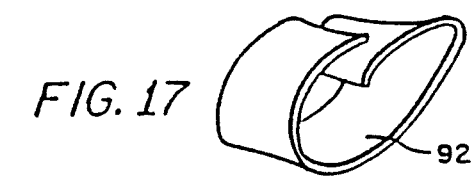
FIG. 17 is a perspective view of patch material used for sealing a leaking overlap joint.

Referring to FIG. 17, a "last resort" patch 92 is shown which is used to provide sealing of a leaking overlap joint. Patch 92 is formed by wrap-around heat shrink material which is wrapped around a leaking overlap joint. The surface of the material is evenly heated with the hot air and the material will, as a consequence, begin to shrink and tighten around the joint. Patch 92 includes an adhesive (not shown) on the underside thereof which softens and fills any pin hole leaks which exist.

Figure 18:
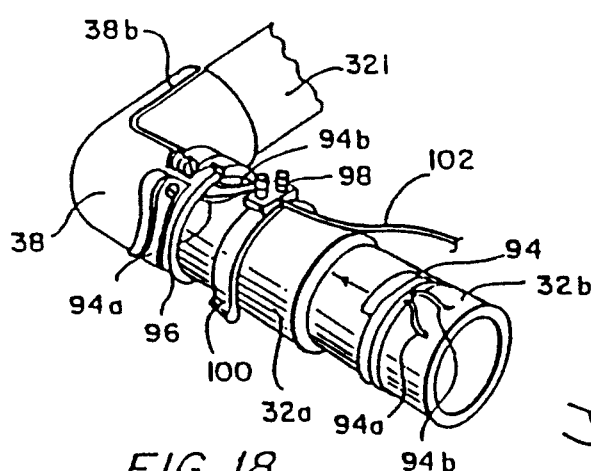
FIG. 18 is a perspective view illustrating the use of fusion wire welding in joining pipe sections together.

Referring to FIG. 18, an illustration is provided of the use of fusion weld wiring in joining pipe sections together. The piping shown in FIG. 18 includes outer pipe sections 32a bonded to a 90° elbow fitting 38 and a telescoping inner pipe section 32b about to be bonded to one of the outer pipe sections 32a after being moved into an overlap position.

The fusion wire used in fusion wire welding comprises a wire ribbon, approximately $\frac{1}{4}$ inch in width and 50 mils in thickness. The ribbon is made up of 24 gauge resistive wire, 70% copper and 30% nickel alloy with a resistance of 0.75 ohms per lineal foot. Preferably four parallel strands of wire coated with high density polyethelene material, corresponding to that used in fabricating the secondary containment pipe and fittings, are used in a welding operation. The length of the wire ribbon is 36 inches with the strip wire ends being connected in such a manner so as to create a single wire circuit with two, 4 inch connector wires (94a, 94b) being located on the same end. The profile of the wire ribbon includes a female and male interlock snap on opposite sides so as to permit the wire ribbon to form a set coil when wrapped around the telescoping pipe section 32a, 32b. As the wire ribbon is being wrapped, the male (barbed) edge snaps into itself as it meets the female edge so as to permit a tight and stable coil to be formed around the secondary pipe which can then be shifted down the pipe into and between the overlap joint created by the outer and inner telescoping pipe sections 32a and 32b.

The latter is illustrated in FIG. 18 where inner pipe section 32b includes a coil 94 of fusion wire ribbon wound thereon which is being moved in the direction indicated by the arrow into the overlap joint between pipe sections 32a and 32b. Once inserted into the overlap joint, with the two connector wires indicated at 934 and 94b extending outwardly therefrom, a steel clamp 96 is installed around the outer telescoping pipe 32a directly over the coiled wire ribbon inside the overlap joint. This is illustrated in FIG. 18 by the overlap joint between section 32a and elbow fitting 38. As illustrated, the two connector wires or leads 94a and 94b are attached to the terminals 98 of a terminal block clamp 100. Clamp 100 snaps onto the pipe section 32a so as to prevent movement of the connector wire leads 92a and 92b during the fusion welding process. The terminal block clamp 100 is connected to the fusion power unit (not shown) by a long (e.g. sic foot) cord 102.

By pressing the start button on the fusion power unit, current is delivered from a 24 volt supply to the fusion welding ribbon of the coil 94. The resistance of the ribbon causes the wires to become hot and create sufficient heat to produce a fusion bond between the outer and inner telescoping pipe sections 32a and 32b. Advantageously, the fusion power unit delivers current for a predetermined amount of time after which power is automatically terminated. It will be appreciated that such a fusion welding procedure can also be used at overlap joints where the outer telescoping pipe 32a is connected to the various fittings and couplings referred to above.

Figure 19:
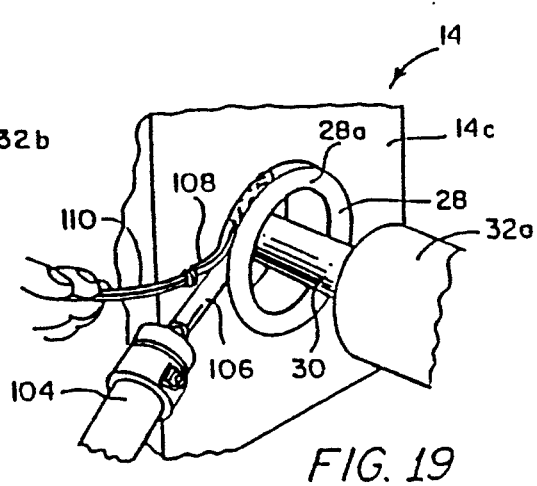
FIG. 19 is a perspective view illustrating the use of fusion rod welding.

Referring to FIG. 19, the fusion rod welding process referred to above is illustrated. The process involves the use of a hot air gun, a portion of which is indicated at 104, that is equipped with a nozzle tip 106 having a offset receiving shaft portion 108 adapted to receive therein a V-shaped plastic rod 110. The plastic rod 110 is inserted into receiving shaft 108 of nozzle tip 106 where the rod 110 is heated and applied to the surface area of a joint to be welded. In the illustrated example, flange 28a of a bulkhead coupling 28 is being welded to the wall of collection sump 14. The hot air gun 104 reheats the surface of the joint as the semi-melted rod 110 is being laid. This produces a strong homogeneous weld. Such a fusion rod welding process is used in bonding the top grooves of the fittings described above as well as around the flange 28a of the bulkhead fitting 28 (as illustrated in FIG. 19) and around the flange 20a of the close-off fitting 20.

Figure 20:
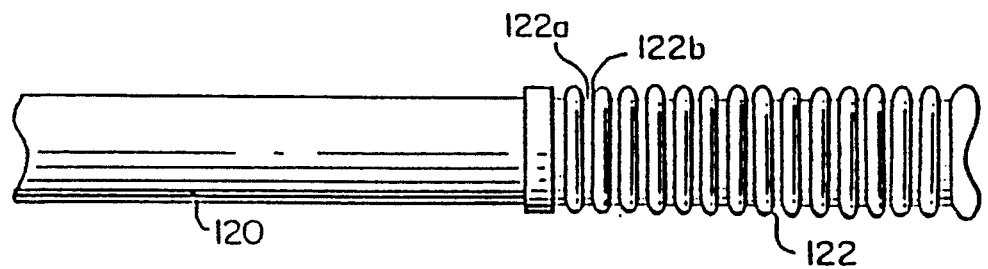
FIG. 20 is a side elevational view of telescoping secondary pipe sections in accordance with a second or further preferred embodiment of the invention.

Referring to FIG. 20, there are shown the basic piping components used in a telescoping pipe section in accordance with a second embodiment of the secondary containment system of the invention. The piping components, which generally correspond to those for the first embodiment, shown in FIG. 8, include an inner, smooth wall pipe 120 contained by or within an outer flexible pipe 122 which is of slightly larger diameter so as to telescope or slide freely over the smooth inner pipe 120. As illustrated, the flexible outer pipe 122 comprises alternating portions 122a and 122b of different diameters so that the outer wall thereof is of a corrugated or "convoluted" configuration. The flexible pipe 122 is preferably made of the same plastic, i.e., high density polyethylene (HDPE), as the piping described previously.

Figure 21:
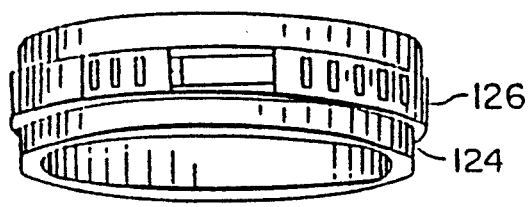
FIG. 21 is a perspective view of a compression seal and clamp used in the second embodiment.

Referring to FIG. 21, as mentioned above and as discussed in more detail below, the connections between the various components of the secondary containment system in accordance with this embodiment of the invention are mechanical and, in particular employ a rubber compression ring or gasket 124 and an associated stainless steel clamp or the like clamping device 126, thereby eliminating the need for any plastic welding. More specifically, the system is connected and sealed by rubber gaskets or compression seals 124 inserted inside of an overlap joint between the components in question, with outside compression being provided by clamp 126. Further, outer flexible pipe 122 includes a molded-in coupling at predetermined intervals therealong (e.g., every 16") for the insertion of a rubber gasket or compression seal sized to fit the inside diameter of the molded in coupling and the outside diameter of inner pipe 120.

Figure 22:
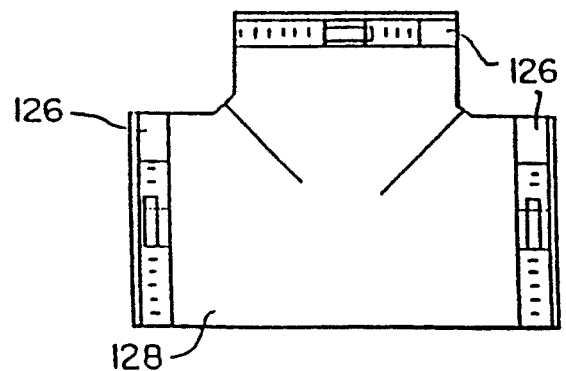
FIG. 22 is a tee fitting used in the second preferred embodiment.

A tee fitting in accordance with this embodiment of the invention is shown at 128 in FIG. 22, and is equipped with three clamps 126 and three rubber gaskets (not shown). In contrast to the first embodiment, tee 128 is a simple molded plastic fitting and includes no split V-groove. Tee 128 is sized large enough to enable the primary tee fitting to be inserted thereinto, prior to the primary tee being connected to the primary pipe (as discussed above in connection with the first embodiment), and is sealed to inner telescoping smooth wall pipes (corresponding to pipe 120) by means of a gasket 124 and a clamp 126 as described in more detail below in connection with FIGS. 25a and 25b. Again, no plastic welding is required.

With respect to the other secondary pipeline elbow fittings, there are no 45° or 90° elbow fittings used in the pipeline system of this embodiment. Instead, the flexible outer pipe 122 of the telescoping piping is used to contain all 90° or 45° primary fittings by sliding the flexible pipe 122 around and over these fittings.

As will be described hereinafter, other components and fittings of the embodiment are similar to those described above but, as set forth previously, use gaskets or compressions seals to connect and seal the secondary system.

Figure 23:
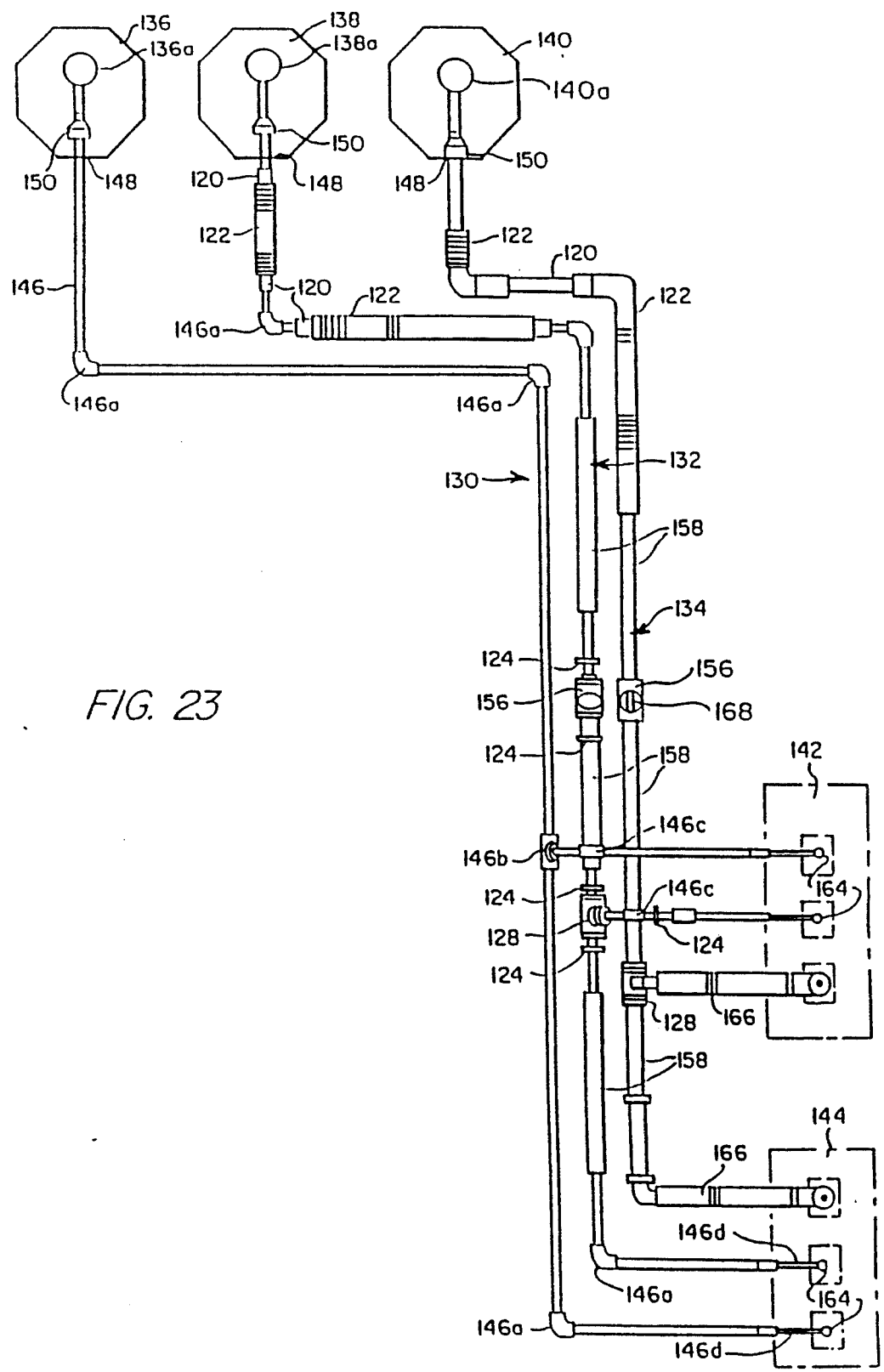
FIG. 23 is plan view of a schematic representation of three pipelines showing different stages in the assembly thereof, in accordance with the second preferred embodiment.

Referring to FIG. 23, a schematic representation is provided of a pipeline system including three pipelines 130, 132, and 134 connected between the submersible pumps 136a, 138a and 140b of corresponding tanks 136, 138 and 140, and corresponding outlets at two different pumping islands 142 and 144, showing the different steps or stages in the assembly of the pipeline.

Briefly describing the installation operation, after all sump-risers (corresponding to those discussed above) have been installed, the cutting or sizing of the primary piping, denoted 146 in FIG. 23, begins. The primary piping is cut and dry-fit before cutting and installing of the secondary piping. When exiting the sump-riser with contained or non-contained piping, grommets, indicated schematically at 148, of the appropriate size are used in place the sealing techniques described above for the first embodiment.

Test clamps, indicated at 150 in FIG. 23, are installed after assembly (as described above) of the swing joint or flex connector (not shown) coming out of the submersible pump (not shown). The test clamps 150 are preferably made of rubber and are similar to those described above for the first embodiment, and use corresponding stainless steel clamps 126 (generally corresponding to those shown in FIG. 21) to clamp them in place. Initially test clamps 150 are installed loosely as shown for pipe lines 130 and 132 but, at a later stage of the assembly, are clamped to a straight-run, corresponding to pipe section 120, pipe for sealing-off and air pressure testing of the secondary pipe system. As illustrated for pipeline 130, the completed primary piping 146 of this example includes 90° elbow fittings 146a, a tee fitting 146b, a 45° elbow fitting 146c, and a flex connector 146d.

Turning to the stage two assembly, as shown for secondary tee 128 (which acorresponds to that shown in FIG. 22), the secondary tees should be installed over the primary tees, e.g., over primary tee 146b, prior to the connection and sealing of the primary tees to the primary pipe. To install secondary tee 128, the compression seals, indicated at 124, are removed and slid onto primary pipe 146. The primary tee 146b is then inserted into the secondary tee 128 and sealed in place. As noted above, the secondary tees 128 are sized large enough to permit them to be shifted back so as to not interfere with the primary pipe.

If zone observation wells are required, a turned-up tee fitting, indicated at 156, is installed, prior to sealing of the primary piping 146, at a suitable location therealong between two sections of straight pipe, denoted 160. At a later stage of assembly, the turned up tee fitting 156 is fitted with a section of straight pipe, which is used as a riser, and sealed on top with a simple rubber observation cap.

Figure 24A:
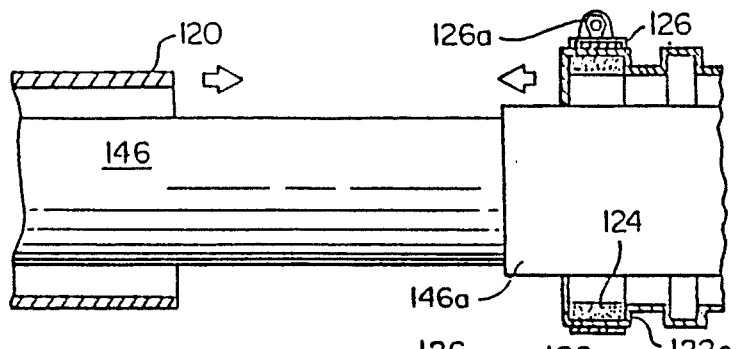
FIGS. 24a and 24b are cross sectional views showing two steps in the connection and sealing of a straight secondary pipe section to a flexible secondary pipe section.
Figure 24B:
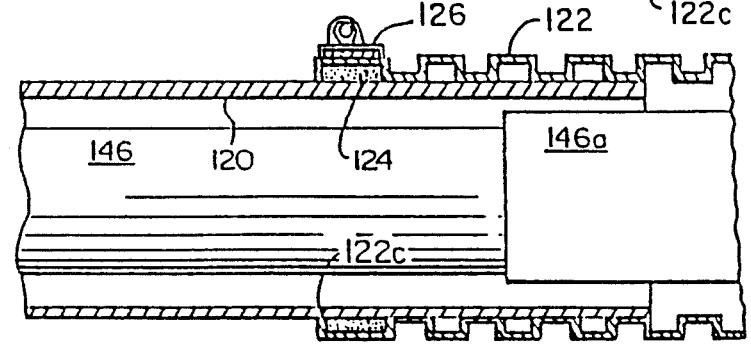

In installing the secondary telescoping pipe, indicated at 120, 122 the compression seals described should be inserted into the end couplings of the flexible pipe sections for installing the pipe over the primary piping 146. This is illustrated in FIG. 24a and 24b wherein compression seal 124 is inserted into a moulded-in coupling 122c at the end of flexible pipe 122. For runs which extend between tees, the runs should begin and end with straight pipe and having the outer flexible pipe inbetween, although in the embodiment illustrated in FIG. 23, simple straight pipes 158 are used, as mentioned above. For runs between tees and elbows, the runs should begin with the outer flexible pipe (at the elbow) and end with the inner straight pipe (at the tee). For long runs (e.g., in excess of 30′) full lengths of telescoping inner straight pipe and outer flexible pipe alternate.

Where crossovers are required in the piping system, as at the 45° elbow fitting 146c, the height of the crossover should accomodate the additional size of the secondary piping. For crossover with tees, the telescoping outer flexible pipe should normally be positioned on the primary pipe so that it may be shifted over 45° elbow fitting and connected to a short section of the telescoping straight pipe at the tee. For crossovers with 90° fittings, the telescoping piping should be cut long enough to extend around the 90° fitting to the adjacent piping run.

The secondary piping system terminates, at the dispenser, just under a shear valve 164, using a terminating flex section generally as described above for swing joint containment or a section of telescoping flexible pipe, as indicated at 166 for pipe line 134, for flex connector containment. It is noted that this stage of assembly, i.e., prior to primary testing, these components need not be installed and may be installed, at a later stage of assembly after primary pipe testing, by the insertion thereof down through the island access opening.

After all secondary components have been installed onto the primary piping and extended into their final positions to double check the lengths thereof, and to make certain that all other components are in their proper positions, connection of the primary pipe may begin. This begins with shifting the telescoping pipe 120, 122 and compression seals 124 away from all primary pipe and fitting connectors, to avoid adhesive an sealant spills from primary connections. It is noted that the telescoping pipe 120, 122 can be shifted from side to side over a piping run to permit complete primary pipe and fitting inspections.

Turning to the stage three assembly, connection of the secondary piping components begins after the primary piping has been connected, tested and inspected. At this time, the pre-installed telescoping pipe 122 is extended into the final position thereof. It is noted that a lubricant, e.g., liquid soap and petroleum jelly, is applied to the 90° fittings such as fittings 146 as to prevent jamming. As illustrated in FIG. 24a and 24b, to connect an outer flexible pipe to a further straight pipe section, the pipe sections should be positioned so that there is a minimum overlap (e.g., 4″ in an exemplary embodiment) therebetween (see FIG. 24b). It is noted that the compression seal 124 inside the flexible pipe 122 should be pre-installed as discussed above. With the pipes positioned as set forth above, the stainless steel clamp 126 is tightened by tightening nut 126a.

To effect sump-riser entry, the telescoping straight pipe located just outside of the sump/riser is shifted into an opening in grommet 148 and caused to extend into the sump-riser a predetermined distance (approximately 4″ in an exemplary embodiment). The test clamp 150 is then connected, by tightening the associated clamp, to the end of the straight pipe of a telescoping section 160, while the other end of the test clamp 150 is connected to the primary pipe 146.

Figure 25A:
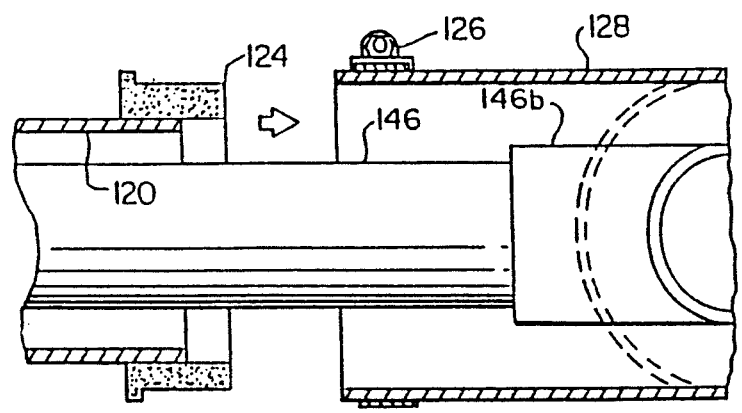
FIGS. 25a and 25b are cross sectional views showing two steps in the connection and sealing of a straight secondary pipe section to a secondary tee section.
Figure 25B:
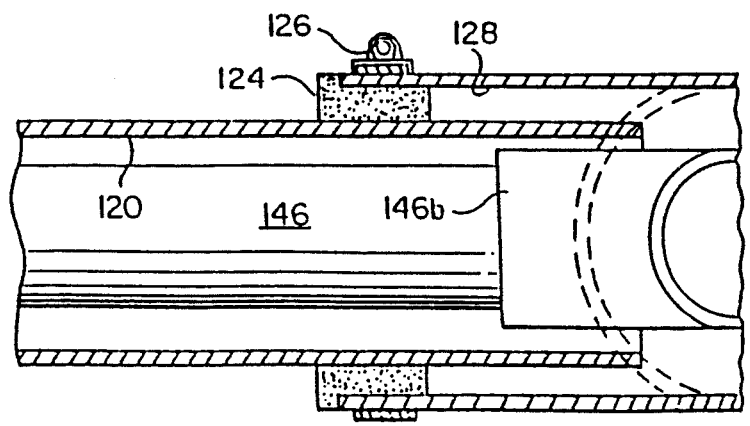
Figure 27A:
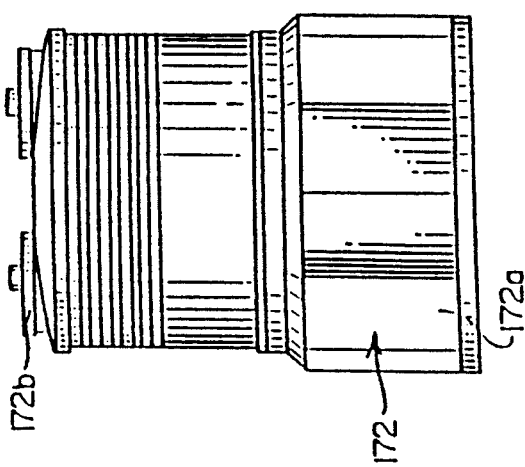
Figure 27B:
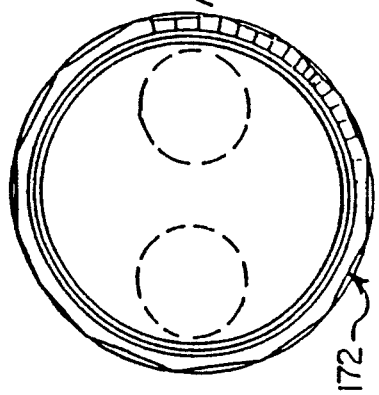
Figure 26A:
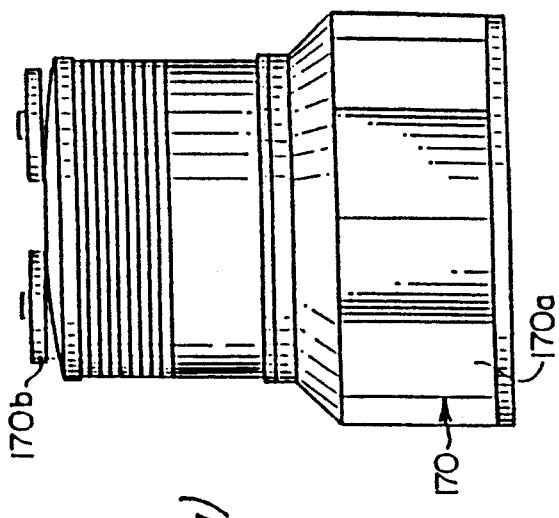
Figure 26B:
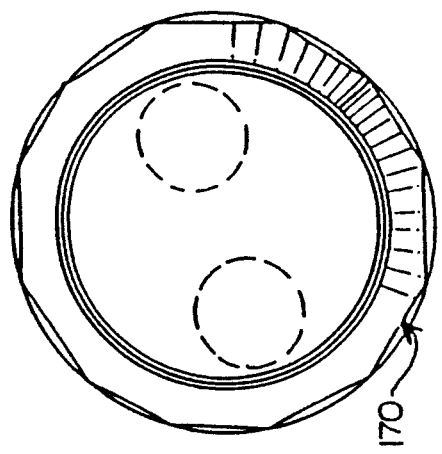

The connecting tees, corresponding to tee 120 (and to tee 156) are installed, as illustrated in FIGS. 25a and 25b, by re-inserting compression seals 124 in place and then inserting the straight pipe, i.e., a pipe section 120, through the compression seals 124 and tightening down on the nuts 126a and stainless steels clamps 126 e.g., by using a manual or electric nut driver (not shown). As will be evident from FIGS. 24a, 24b, and 25a, 25b, a variety of compression seals can be used depending on the job, the pipe sizes, and the like.

Regarding connection of the observation wells, as discussed above, the turned up tee fitting 156 is connected to a straight pipe section (not seen in FIG. 23) which serves as a riser and which is sealed at the top using a rubber observation cap, indicated at 168, to permit future access to the observation well.

The connection of crossovers, and the containment of swing joints and flex connectors should be evident from the description of the second stage assembly above.

After all secondary pipeline components have been assembled, an air-pressure-soap test may be performed to detect any pinhole leaks. Any leaks detected at the overlap joints can be eliminated by reassembling the overlap joint or simply tightening the clamp down more firmly. Hydrostatic hold testing can also be performed if required wherein water is added to the secondary pipe system.

The sump-riser of the invention (discussed above, for example, in connection with FIG. 1) is preferably of one of the configurations shown in FIGS. 26a and 26b, FIGS. 27a and 27b, FIGS. 28a and 28b, or FIGS. 29a and 29b. In general, these sump-risers perform as a collection sump, as a riser for the corresponding tank and as a means for secondary containment for the tank's submersible pump, manway and fittings. As illustrated, the sump-risers, which are respectively denoted 170, 172, 174, and 176, are multi-sided to provide flat walls, denoted 170a, 172a, 174a and 176a, respectively, for accurate hole drilling for pipe and conduit entry and include vented access lids, denoted 170b, 172b, 174b and 176b, to prevent surface water from entering while allowing the escape of any dangerous vapors. The sump-risers are made of a thick high density polyethylene material, which provides excellent strength, chemical resistance and soil burial stability and is also easy to work with in the field. The different sizes and constructions are used to accommodate the demands of different facilities and environments. The various mounting accessories for mounting these sump-risers to any type of underground storage tank can be of the types discussed above in connection with, for example, FIGS. 4a and 4b, 5a and 5b, 6a and 6b and 7.

Figure 31:
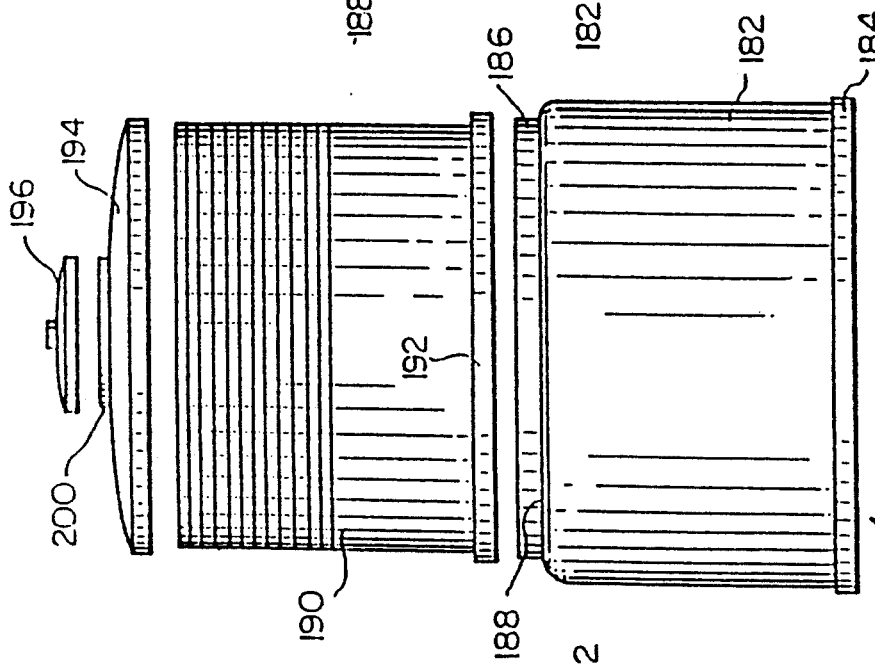
Figure 30:
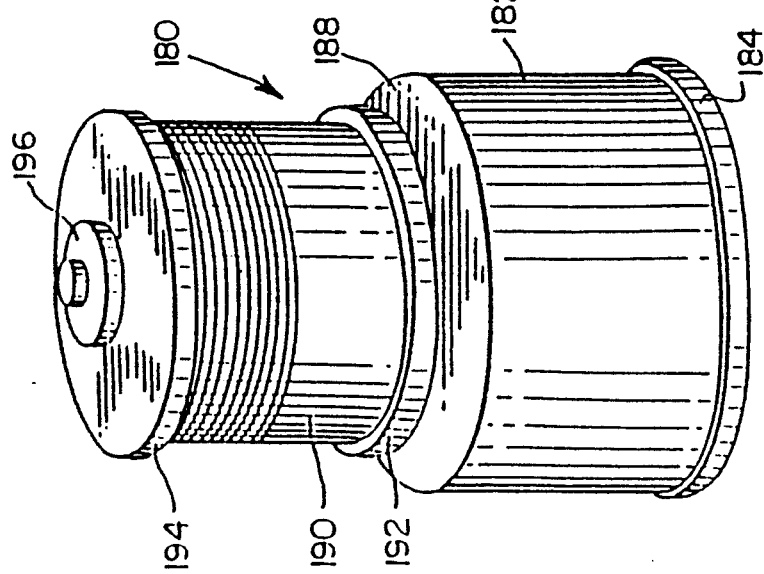

Referring to FIGS. 30 and 31, a further embodiment of the sump-riser apparatus of the invention is shown. As perhaps can best be seen in FIG. 31, which is an exploded view, in side elevation, of the sump-riser shown in perspective in FIG. 31, the basic components of the sump-riser, which itself is generally denoted 180, comprise a generally cylindrical sump base 182 including a step annual base flange 184 and an upright annular lip 186 extending upwardly from upper support surface 188 of sump base 182; an extension riser 190 including a lower annular riser lip 192 which fits over and around lip 186 of sump base 182; a cover 194; and an access or observation lid 196.

Riser extension 190 is detachable or removable from sump base 182 which permits compact shipping as explained below. Score lines, indicated at 198 and typically spaced inch apart, serve as cutting guide lines for height sizing. The annual lip or step 188 on bottom of riser extension 190 provides reinforcement or strengthening of riser extension 190 and also serves an additional purpose discussed below.

Access cover 194 is a man access cover which prevents surface run waste from entering the sump-riser 180 and includes an upstanding annular lip 200 which surrounds a central opening 202 (see FIG. 32) in cover 194 and over which observation lid 196 fits. Observation lid 196, when removed, enables general inspection of the inner workings of the sump-riser 180.

As discussed above, rubber seals or grommets are used to seal all pipe conduit entries (not shown in FIGS. 30 and 31) and grommets are used in this embodiment which enable elimination of the flat sides of the previous embodiments discussed hereinabove.

Figure 32:
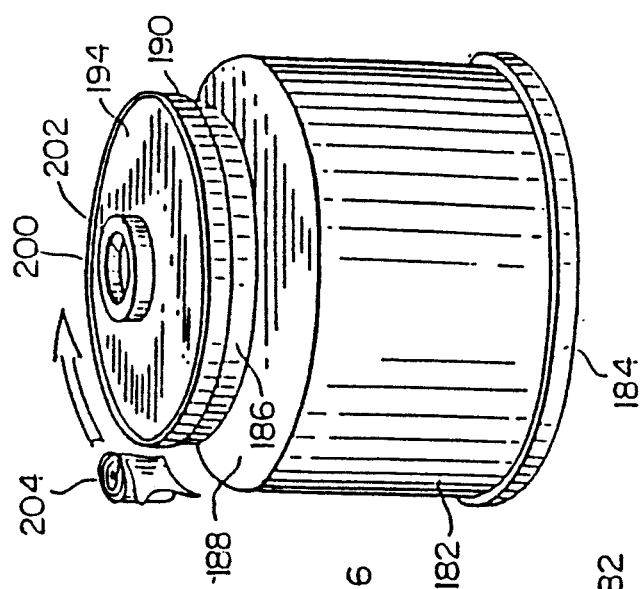

An important feature of the embodiment of FIGS. 30 to 32 is that this embodiment enables compact shipping of the components. In particular, as indicated in FIG. 32, after trimming and cleaning of all of the components, the riser extension 190 is turned upside down and lowered into sump base 182. The riser lip or step 192 will thus extend above lip 186 on sump base 182, as shown in FIG. 32, and in this position serves as receptacle for the cover 194 which is fit therein. With the basic components so assembled, heat shrink tape, indicated at 204, can be used to seal the components together.

Although the invention has been described relative to exemplary embodiments thereof, it will be understood by those skilled in the art that variations and modifications can be effected in these exemplary embodiments without departing from the scope and spirit of the invention.

I claim:

1. A sump-riser apparatus, comprising:
   a) a sump base having upper and lower portions, said upper portion having an opening formed therein;
   b) a riser extension mounted on said sump base, said sump base and said riser extension being separate pieces, said riser extension being of a size and shape relative to said sump base such that when said riser extension is inverted for compact shipping at least a portion of said riser extension is receivable within said sump base;
   c) said riser extension includes an annular lip which rests on said upper portion of said sump base when said riser extension is mounted thereon; and,
   d) a cover mounted on said riser extension, said cover being of a size and shape relative to said annular lip such that said cover rests in said annular lip when said riser extension is inverted for compact shipping.

2. An apparatus as in claim 1, wherein:
   a) a major portion of said riser extension is receivable within said sump base when inverted for compact shipping.

3. An apparatus as in claim 2, wherein:
   a) said riser extension includes a plurality of cutting guides.

4. An apparatus as in claim 1, wherein:
   a) said sump base is generally cylindrical.

5. An apparatus as in claim 1, wherein:
   a) said cover is removably mounted on said riser extension.

6. An apparatus as in claim 1, wherein:
   a) said sump base includes an annular wall which extends between said upper and said lower portions; and,
   b) said riser extension is mounted on said sump base inwardly of said annular wall.

7. An apparatus as in claim 1, wherein:
   a) said sump base, said riser extension and said cover are formed from polyethylene.

8. A sump-riser apparatus, comprising:
   a) a sump base having upper and lower portions, said upper portion having an opening formed therein;
   b) a riser extension mounted on said sump base, said riser extension having upper and lower portions, said lower portion having an opening formed therein, said opening formed in said lower portion of said riser extension communicates with said opening in said upper portion of said sump base;
   c) said riser extension including an outer surface having a plurality of cutting guides formed thereon; and,
   d) a cover mounted on said riser extension.

9. An apparatus as in claim 8, wherein:
   a) said riser extension and said sump base are separate pieces.

10. An apparatus as in claim 8, wherein:
    a) said cover is removably mounted on said riser extension.

11. An apparatus as in claim 8, wherein:
    a) said riser extension is of a size and shape relative to said sump base such that when said sump base is inverted for compact shipping at least a portion of said riser extension is receivable within said sump base.

12. An apparatus as in claim 11, wherein:
    a) said riser extension includes an annular lip which rests on said upper portion of said sump base when said riser extension is mounted thereon; and,
    b) said cover is of a size and shape relative to said annular lip such that said cover rests in said annular lip when said riser extension is inverted for compact shipping.

13. An apparatus as in claim 8, wherein:
    a) said sump base includes an annular wall which extends between said upper and said lower portions; and,
    b) said riser extension is mounted on said sump base inwardly of said annular wall.

14. An apparatus as in claim 8, wherein:
    a) said sump base and said riser extension are substantially cylindrical in shape.

15. An apparatus as in claim 8, wherein:
    a) said cover includes an opening formed therein; and,
    b) an access lid is mounted over said opening formed in said cover.

16. An apparatus as in claim 8, wherein:
    a) said sump base, said riser extension and said cover are formed from polyethylene.

17. A sump-riser apparatus for a pipeline system, said apparatus comprising:
    a) a hollow collection sump base for collecting fluid leaking from a pipeline system including at least one side wall and an upper annular wall portion extending inwardly from the top of said at least one side wall to define an upper surface having a central opening therein;
b) a generally cylindrical riser extension removably mounted to said sump base adjacent the upper surface defined by the upper wall portion of said sump base in surrounding relationship to said central opening in said upper wall portion and including at least one side wall, a lower opening in communication with said central opening and an upper opening; and,
c) an access cover, mounted on the top of said extension riser over said upper opening, for enabling access to the interior of said sump-riser apparatus, said access cover being adapted to be positioned below a manhole cover.

18. An apparatus as in claim 17, wherein:
a) said riser extension includes a plurality of cutting guides formed on an outer surface thereof.

19. An apparatus as in claim 18, wherein:
a) said riser extension includes an annular lip which rests on said upper portion of said sump base when said riser extension is mounted thereon; and,
b) said cover is of a size and shape relative to said annular lip such that said cover rests in said annular lip when said riser extension is inverted for compact shipping.

20. An apparatus as in claim 17, wherein:
a) said riser extension is mounted on said sump base inwardly of said side wall.

21. An apparatus as in claim 17, wherein:
a) said cover is removably mounted on said riser extension.

22. An apparatus as in claim 17, wherein:
a) said sump base and said riser extension are generally cylindrical.

23. An apparatus as in claim 17, wherein:
a) said sump base, said riser extension and said cover are formed from polyethylene.

24. A sump-riser apparatus, comprising:
a) a sump base having upper and lower portions, said upper portion having an opening formed therein;
b) a riser extension mounted on said sump base, said riser extension having upper and lower portions, said lower portion having an opening formed therein, said opening formed in said lower portion of said riser extension communicates with said opening in said upper portion of said sump base;
c) said riser extension including an outer surface having a plurality of cutting guides formed thereon.

25. An apparatus as in claim 24, wherein:
a) said sump base and said riser sections are separate pieces.

26. An apparatus as in claim 24, wherein:
a) said sump base and said riser extension are formed from polyethylene.

27. A sump-riser apparatus for a fuel pipeline system, said sump-riser apparatus comprising:
a) a hollow collection sump base for collecting fuel leaking from a pipeline system, said sump base including at least one side wall and an upper annular wall portion extending inwardly from the top of said side wall to define an upper surface having a central opening therein;
b) a generally cylindrical riser extension extending upwardly from the upper surface defined by the upper wall portion of said sump base in surrounding relationship to said central opening in said upper wall portion and including at least one side wall, a lower opening in communication with said central opening and an upper opening;
c) an access cover, mounted on the top of said extension riser over said upper opening for enabling access to the interior of said sump-riser apparatus; and,
d) one of said sump base and said riser extension having a plurality of panels.

28. An apparatus as claim 27, wherein:
a) said sump base and said riser section are separate pieces.

29. A sump-riser apparatus for a pipeline system, said apparatus comprising:
a) a one-piece hollow collection sump base for collecting fluid leaking from a pipeline system including at least one side wall and an upper annular wall portion extending inwardly from the top of said at least one side wall to define an upper surface having a central opening therein;
b) a generally cylindrical riser extension extending upwardly from the upper surface defined by the upper wall portion of said sump base in surrounding relationship to said central opening in said upper wall portion and including at least one side wall, a lower opening in communication with said central opening and an upper opening; and,
c) an access cover, mounted on the top of said extension riser over said upper opening, for enabling access to the interior of said-riser apparatus, said access cover being adapted to be postioned below a manhole cover.

30. An apparatus as in claim 29, wherein:
a) said sump base and said riser extension are separate pieces.

31. An apparatus as in claim 29, wherein:
a) said sump base, said riser extension and said cover are formed from polyethylene.

* * * * *

UNITED STATES PATENT AND TRADEMARK OFFICE
CERTIFICATE OF CORRECTION

PATENT NO. : 5,333,490
DATED : August 2, 1994
INVENTOR(S) : MICHAEL C. WEBB

It is certified that error appears in the above-indentified patent and that said Letters Patent is hereby corrected as shown below:

Columns 18 - 19

Delete Claims 8-15, 18, 19, 24 and 25, in their entirety.
Col. 17,
Delete Claim 3 in its entirety.
On title page, "31 Claims, 11 Drawing Sheets" should read
--"16" Claims, 11 Drawing Sheets--.

Signed and Sealed this

Twenty-ninth Day of November, 1994

Attest:

BRUCE LEHMAN

Attesting Officer    Commissioner of Patents and Trademarks